A. W. OPPMANN.
APPARATUS FOR MASHING.
No. 194,559. Patented Aug. 28, 1877.
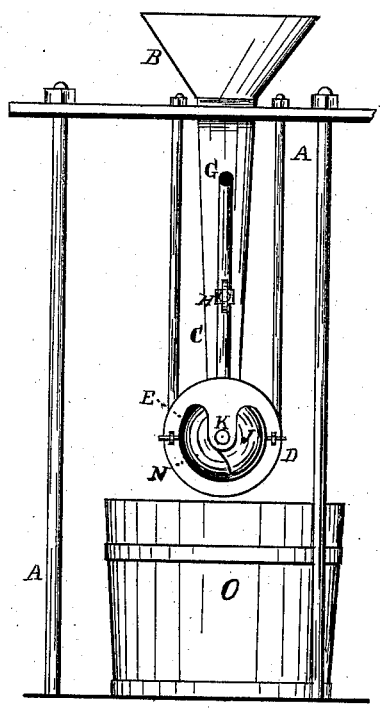
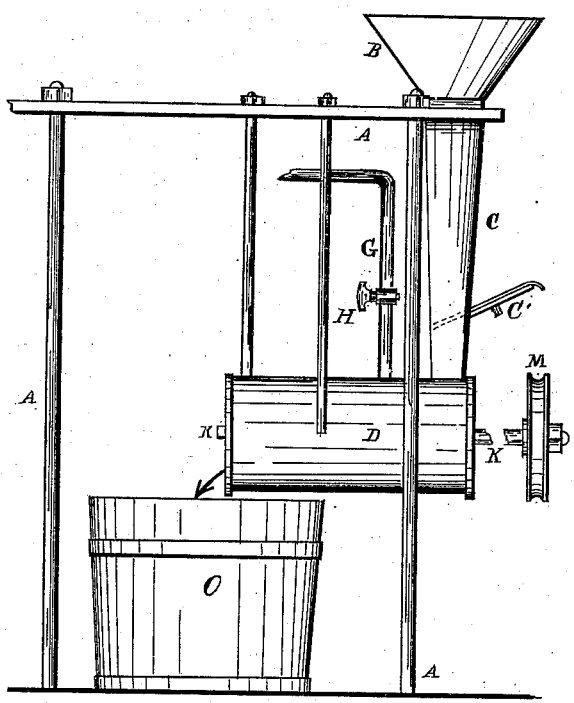
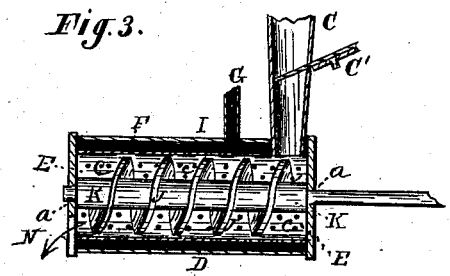

UNITED STATES PATENT OFFICE.

ANDREW W. OPPMANN, OF CLEVELAND, OHIO.

IMPROVEMENT IN APPARATUS FOR MASHING.

Specification forming part of Letters Patent No. 194,559, dated August 28, 1877; application filed July 10, 1877.

*To all whom it may concern:*

Be it known that I, ANDREW WILLIAM OPPMANN, of Cleveland, in the county of Cuyahoga and State of Ohio, have invented a certain new and Improved Mash-Machine for Brewing; and I do hereby declare that the following is a full, clear, and complete description thereof, reference being had to the acccompanying drawings, making a part of the same.

The nature of my invention relates to a machine for preparing mash for brewing, the object of which is to facilitate the preparation of the malt by rapidly and readily charging the same with water effectually, and in the desired proportion, by agitating the grain by means of spiral wings or conveyer in a chamber having perforations, through which the water passes to the grain or malt as it is conveyed out of the chamber, the malt being conveyed into the chamber through a spout provided with a gage-slide, to control the supply.

Figure 1 is an end view. Fig. 2 is a side view; Fig. 3, a detached section.

Like letters of reference refer to like parts in the several views.

The frame A of the machine may be constructed in any desirable manner suitable for the purpose desired, or in such way as to support the various parts of the machine; hence no special description or definite form may be here required.

To the hopper B is connected a spout or tube, C, which tube extends to and through the cylinder D, Figs. 1 and 2, and is in open relation with the grain-chamber E, as seen in Fig. 3. By this means the malt or grain will readily pass from the hopper through the tube to the chamber E.

In the tube C is a slide-gage, C', for the purpose of governing the quantity of malt conveyed to the chamber aforesaid from the hopper. The wall or walls of this chamber E are perforated, through which perforations water or other liquid passes from the annular chamber F. This annular chamber is supplied with water, &c., by means of the pipe G, which pipe is provided with a cock, H, for the purpose of cutting off and gaging the supply for the annular chamber, &c.

The pipe G, as will be seen in Fig. 3, passes only through the outside wall I, while the tube C passes through the outer and inner walls to the chambers. In this chamber E is a worm or spiral conveyer, J, attached to the shaft K, which shaft is journaled at *a a* in the ends or heads of the chambers, Fig. 3.

To the outer end of the shaft is connected a pulley, M, for operating the spiral conveyer by means of a belt; or, if desired, some other device may be employed for this purpose. In the front end or head is an opening, N, for allowing the malt to be discharged from the chamber into the mash-tub O.

The heads or ends referred to may be connected and secured in place by any ordinary means by which they may be readily taken off and replaced as may be needed.

The malt or grain is passed into the chamber E through the tube C, and at the same time water is also let into the said chamber in sprays or jets through the perforations *c*, Fig. 3. This water is mixed up with the malt by the revolving spiral conveyer. This agitation of the grain continually and intimately stirs and mixes up malt and water together, producing a complete and rapid saturation. At the same time the malt or grain is being carried along through the chamber from its ingress to its discharge at N into the mash-tub, as indicated by the arrow in Figs. 2 and 3.

The speed of the conveyer will determine the length of time for the malt to remain in the chamber to be properly treated.

The annular water-chamber F is constantly filled with water, which may be at any proper degree of temperature. This water is discharged into the chamber E upon all sides upon the malt.

What I claim as my invention, and desire to secure by Letters Patent, is—

1. The revolving spiral conveyer J, chamber E, and annular chamber F, in combination with the pipe G and tube C, substantially as and for the purpose set forth.

2. The chamber E, with the wall or sides thereof perforated, and opening into the water-chamber F, and having a spiral conveyer, J, for agitating and conducting the saturated malt from its ingress through the perforated chamber E to its discharge, substantially as described, and for the purpose specified.

3. In mash-machines, the combination of an annular water-chamber provided with an induction water-pipe, a chamber with perforated sides, an induction grain-tube, and a revolving conveyer therein, surrounded by the said annular water-chamber, substantially as described, and for the purpose set forth.

ANDREW WILLIAM OPPMANN.

Witnesses:
    J. H. BURRIDGE,
    W. H. BURRIDGE.